United States Patent [19]
Long

[11] Patent Number: 5,685,408
[45] Date of Patent: Nov. 11, 1997

[54] ELECTRO-HYDRAULIC TRANSMISSION SYSTEM WITH A TORQUE CONVERTER CLUTCH CONTROL

[75] Inventor: Charles Francis Long, Pittsboro, Ind.

[73] Assignee: General Motors Corporation, Detroit, Mich.

[21] Appl. No.: 667,887

[22] Filed: Jun. 20, 1996

[51] Int. Cl.$^6$ ................................................ F16H 61/14
[52] U.S. Cl. ................................................ 192/3.58
[58] Field of Search ............................ 477/62; 192/3.58, 192/3.63

[56] References Cited

U.S. PATENT DOCUMENTS 4,431,095  2/1984  Suga ........................................ 192/3.58

*Primary Examiner*—Dirk Wright
*Attorney, Agent, or Firm*—Donald F. Scherer

[57] ABSTRACT

An electro-hydraulic transmission control has a plurality of shift valves or relay valves controlling the selective delivery of pressure fluid to friction devices and for exhausting pressure from the friction devices. One of the shift valves is operable in reverse and low drive range to prevent engagement of a torque converter clutch and is also operable to permit engagement of the torque converter clutch in neutral and in low hold range.

4 Claims, 4 Drawing Sheets

ELECTRO-HYDRAULIC TRANSMISSION SYSTEM WITH A TORQUE CONVERTER CLUTCH CONTROL

TECHNICAL FIELD

This invention relates to electro-hydraulic controls for power transmissions.

BACKGROUND OF THE INVENTION

Automatic transmissions used in transportation vehicles, such as large trucks and buses, often have a clutch utilized with the torque converter to provide slip. Such items are called torque converter clutches. The torque converter clutches preferably engage at higher vehicle speeds, such as during cruising, to improve the overall economy. It is generally not useful to have the torque converter clutch engaged during low or reverse operation, thereby improving the gradeability of the vehicle by increased multiplication from the torque converter and improved fuel economy when the torque converter clutch is engaged.

In more recent times, the transmission control systems have changed from hydraulic or hydro-mechanical systems to electro-hydraulic or electro-hydraulic mechanical systems. These systems incorporate the use of solenoid valves or solenoid control valves which are operable to produce an on/off pressure signal or a variable pressure signal.

With the use of the electronic controls, the torque converter clutch (TCC) is actuated with an electro-hydraulic solenoid. This provides considerable flexibility in the application or engagement of the torque converter clutch under various conditions. However, the solenoid valves require very small orifices or restrictions in their control circuits, such that debris may bypass the filter in the system and cause a pressure problem resulting in the torque converter clutch being maintained in the engaged condition despite a computer or electronic command for disengagement. This can result in a stalled engine or an inoperable vehicle. While this condition is not critical to the vehicle, it is or can be disconcerting. It will require the operator to do something not ordinarily required with vehicle operation in order to return the vehicle to a repair station.

The present invention prevents the engagement of the torque converter clutch whenever the transmission is conditioned for the reverse or low forward drive ratio during normal operation. However, the present invention permits the engagement of the torque converter clutch during neutral or the low hold operation.

During neutral operation, it may be desirable to have the torque converter clutch engaged when power is being directed to a power take off (PTO) shaft and during low hold operation when engine braking is desired, such as when maneuvering down a grade.

It is therefore an object of this invention to provide an improved transmission control for establishing conditions during which the torque converter clutch may be selectively controlled.

In one aspect of the invention, a relay or shift valve is spring set to direct a control pressure to prevent actuation of the torque converter clutch during reverse and low drive operation and in a pressure set condition to permit actuation of the torque converter clutch.

Generally, during low speed operation, it is desirable to inhibit the torque converter clutch from engaging. This, however, is complicated by the desire to engage the torque converter clutch in neutral and in first hold range. To accomplish these conflicting uses, the torque converter clutch operation is inhibited in two states only; that is, reverse and first range operation. These two ranges require one relay or shift valve to be held in the off state and another shift valve be held in the on state. This permits a control pressure to be distributed by the shift valve in the off state to a chamber on a torque converter clutch regulator valve. The chamber on the regulation valve is operable to prevent engagement of the torque converter clutch by maintaining the pressure in the clutch apply circuit at a very low or exhaust level.

The present invention can be incorporated into electro-hydraulic controls, such as those shown in U.S. Ser. No. 08/542,572, filed Oct. 13, 1995, and assigned to the assignee of the present application.

DESCRIPTION OF AN EXEMPLARY EMBODIMENT

Figure 1:
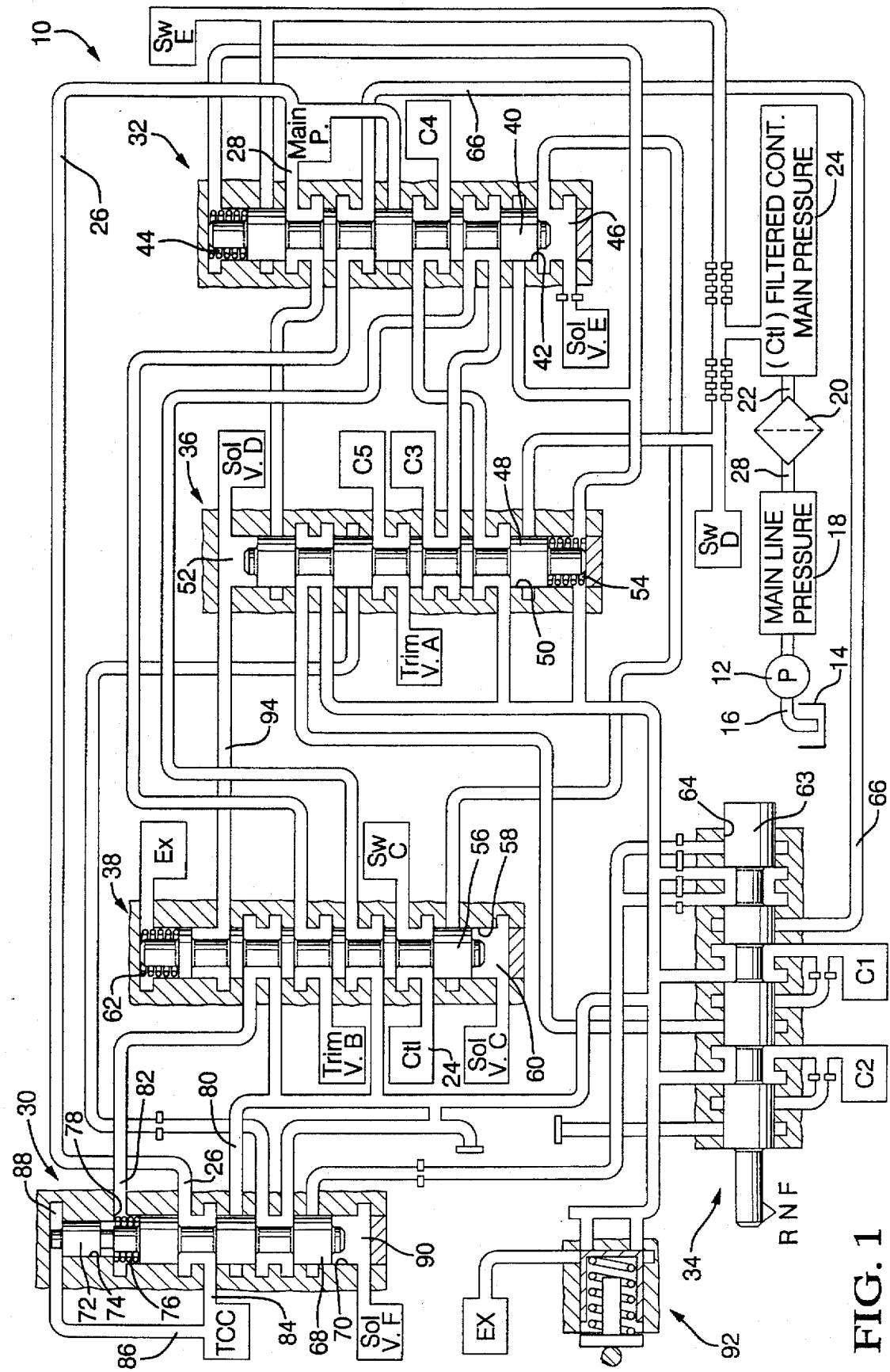
FIG. 1 is a diagrammatic representation of a portion of a transmission control system incorporating the present invention and showing the neutral condition.

Referring to the drawings, wherein like characters represent the same or corresponding parts throughout the several views, there is seen in each of the Figures an electro-hydraulic transmission control 10. This control incorporates a positive displacement hydraulic pump 12 which draws fluid from a reservoir 14 for delivery to a passage 16.

The passage 16 is connected with a conventional regulator valve 18 which establishes the mainline pressure within the transmission for delivery to various component within the transmission control. The mainline pressure is also distributed to a passage 28 which directs fluid to a filter 20 from which the filtered fluid is directed by a passage 22 to a filtered control main pressure 24. The main pressure is distributed through a passage 26 and 28 to a torque converter clutch regulator valve 30 and to a shift or relay valve 32, respectively.

The control 10 also includes a manual selector valve 34, a second shift or relay valve 36 and a third shift or relay valve 38. The relay valve 32 includes a valve spool 40 slidably disposed in a valve bore 42. The valve spool 40 is urged in the spring set position shown by a spring 44. The valve spool 40 may be moved upward against the spring 44 by the distribution of pressurized fluid from a solenoid valve E to a chamber 46 adjacent one end of the valve spool 40.

The valve 36 includes a valve spool 48 which is slidably disposed in a valve bore 50 and is urged to a pressure set position shown by fluid pressure in a chamber 52 adjacent one end of the valve spool 48. When the pressure chamber 52 is exhausted through a solenoid valve D, a spring 54 is effective to urge the valve spool 48 to a spring set position.

Figure 2:
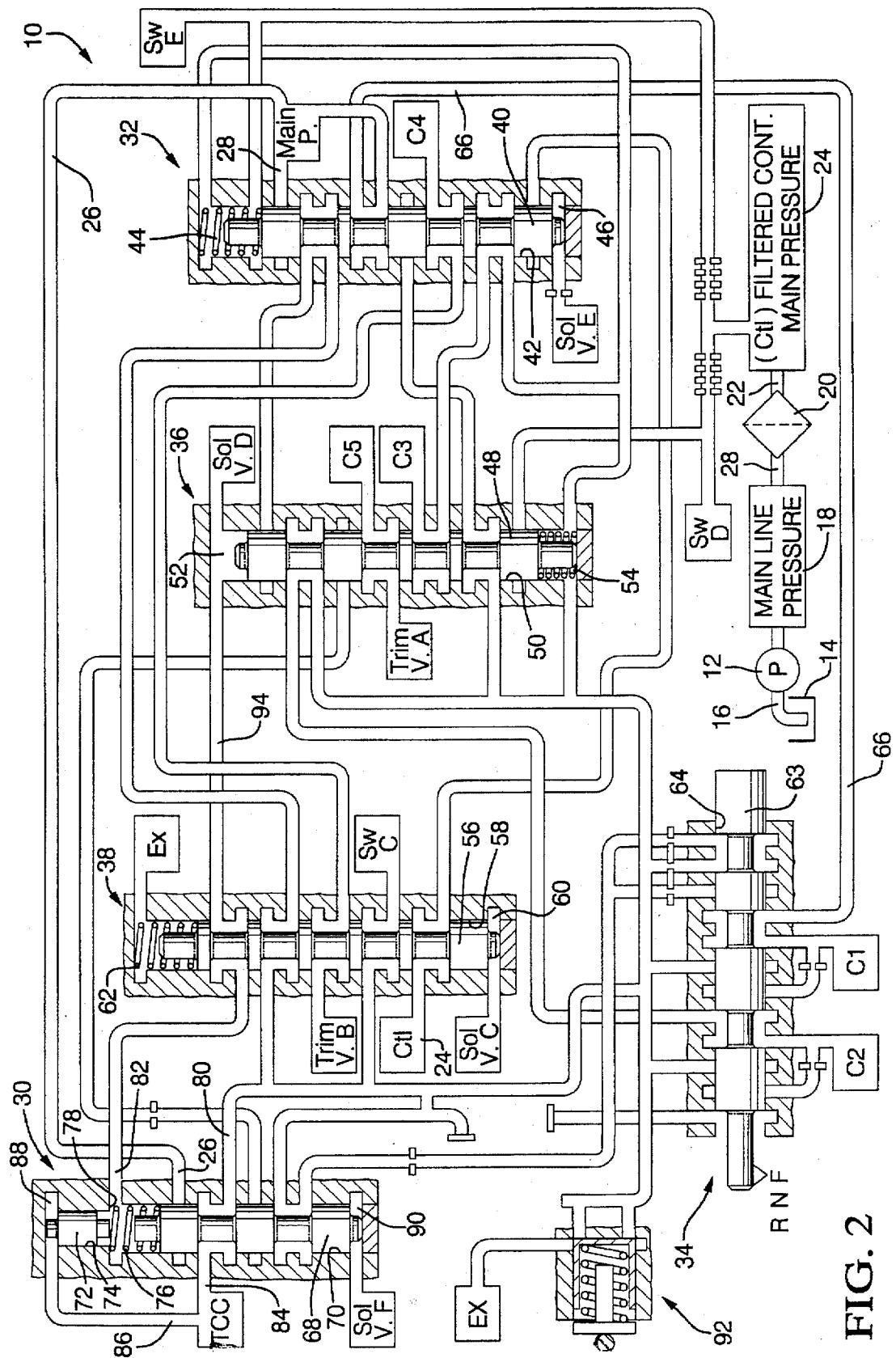
FIG. 2 is a diagrammatic representation similar to FIG. 1 with the control conditioned for the low drive ratio.
Figure 3:
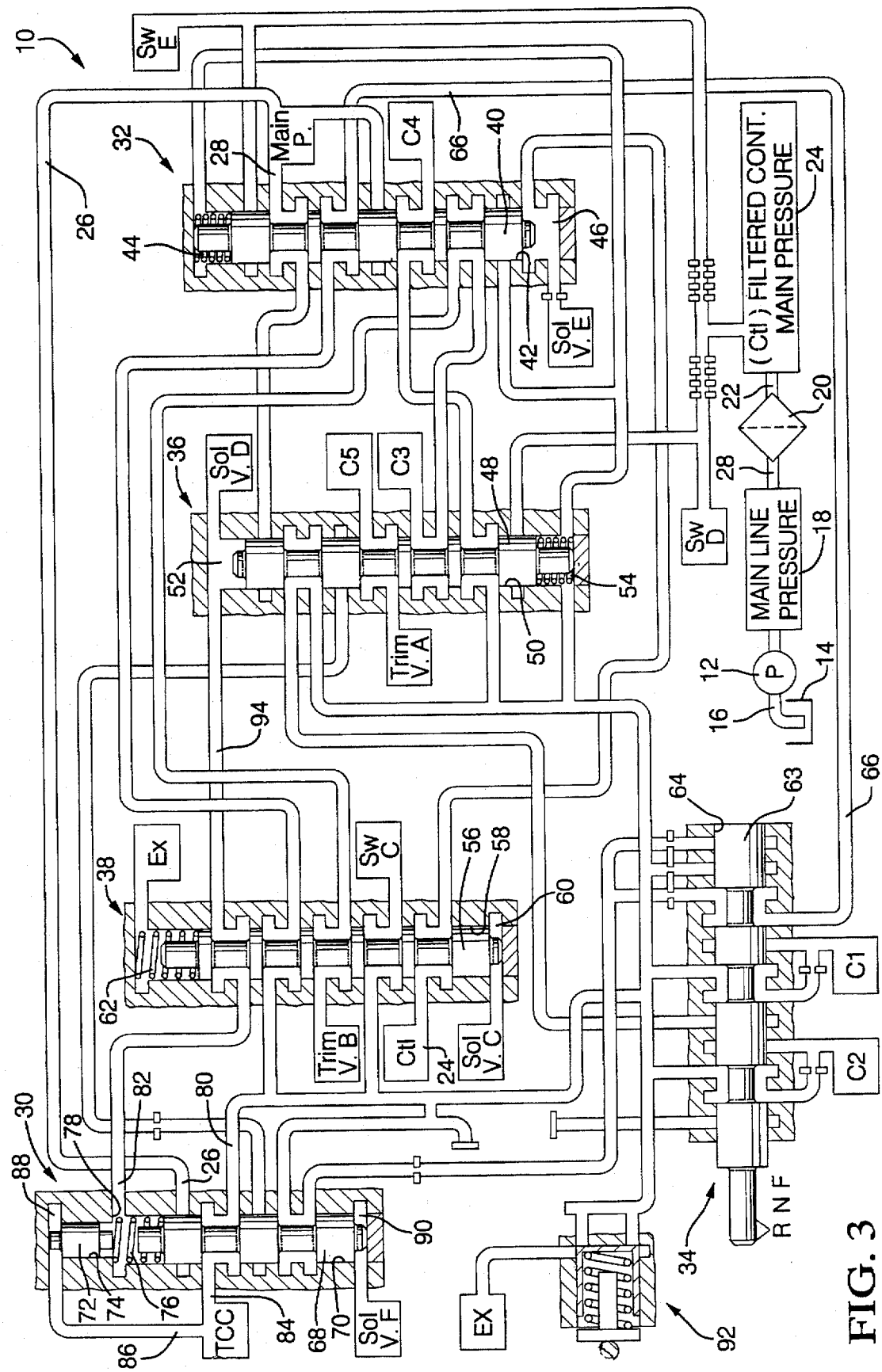
FIG. 3 is a diagrammatic representation similar to FIG. 1 with the control conditioned for reverse operation.

The relay valve 38 has a valve spool 56 slidably disposed in a valve bore 58. The valve spool 56 is urged to the pressure set position shown by fluid pressure in a chamber 60 which receives fluid from a solenoid valve C. When the solenoid valve C exhausts the chamber 60, a spring 62 will urge the valve spool 56 to a spring set position as shown in FIGS. 2 and 3.

Figure 4:
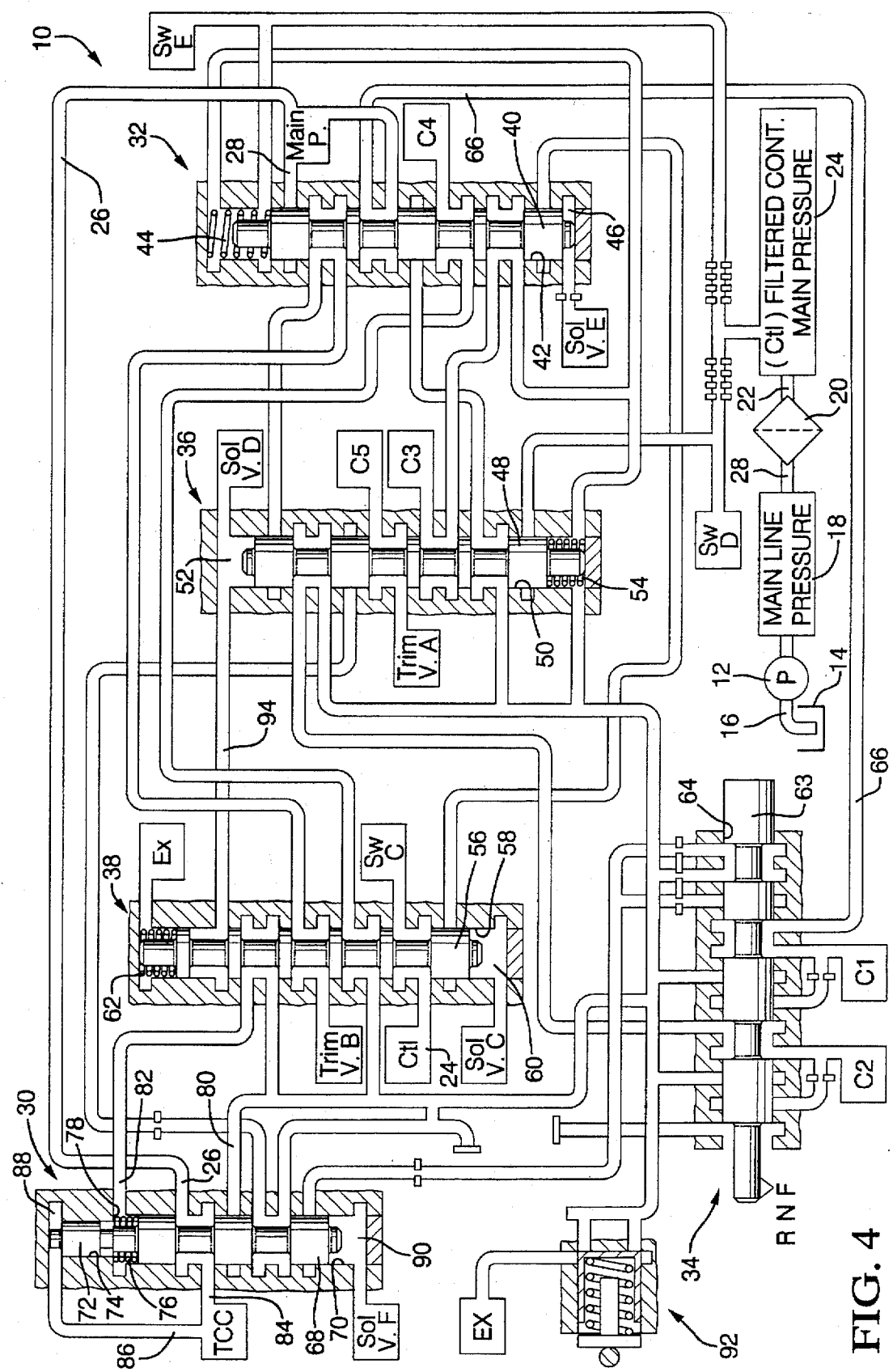
FIG. 4 is a diagrammatic representation similar to FIG. 1 with the control conditioned for the low hold operation.

The manual valve 34 includes a valve spool 63 slidably disposed in a valve bore 64. The valve spool 63 may be manipulated either manually or electronically to the neutral N position shown, or to a forward position F as seen in FIGS. 2 and 4, or to a reverse position R as seen in FIG. 3.

The valve spool 63 is effective to control pressure distribution to a pair of rotating clutches C1 and C2. The rotating clutches C1 and C2 are useful in transmitting power from a prime mover, such as an internal combustion engine to planetary gear sets. The planetary gear arrangement found to be useful with the current control is that shown in U.S. Pat. No. 4,070,927 issued Jan. 31, 1978, to Polak and assigned to the assignee of the present application.

The transmission shown in Polak will provide six forward speeds, a neutral and a reverse speed, and those who might be interested in the operation of that particular transmission, may do so by reviewing the afore-mentioned patent. The Polak patent does incorporate a continuous input drive from the engine in combination with the rotating clutches C1 and C2. The above-described patent also includes three brake members C3, C4 and C5. A review of the patent will show that the first and lowest forward speed is provided by engagement of C1 and C5. Second gear is provided by engagement of C1 and C4. Third gear is provided by engagement of C1 and C3. Fourth gear is provided by engagement of C1 and C2. Fifth gear is provided by the engagement of C2 and C3, and sixth gear is provided by the engagement of C2 and C4.

These ratio interchanges are accomplished by the selected manipulation of the solenoid valves C, D and E, as well as the distribution of a control pressure from a trim valve A and from a trim valve B. The trim valves A and B are PWM or pulse width modulated devices. In the alterative, the trim valve A and trim valve B may be pressure proportional valve mechanisms which are also electronically controlled. The utilization of the trim valves A and B permit the on-coming friction device to be modulated and the off-going friction device to be modulated.

To establish the first and lowest ratio, the control system 10 is disposed as shown in FIG. 2 with the manual valve being placed in the forward position; the solenoid E being deactuated; the solenoid D being actuated, and the solenoid C being deactuated. Thus, the valves 32 and 38 are in the spring set positions and the valve 36 is in the pressure set position. In the spring set position, the valve 32 distributes main fluid pressure in passage 28 through the valve 32 to a clutch engage or clutch apply passage 66. The pressure in passage 66 is directed through the manual valve 34 to the rotating clutch C1. The trim valve A is energized in a controlled condition to distribute fluid pressure through the valve 36 to the friction device C5. This will permit controlled engagement of the device C5.

To interchange from the first condition to the second condition, the trim valve B is controlled to engage the device C4 via the valves 38 and 32 while the trim valve A is actuated or controlled to de-energy or disengage the friction device C5. The upshifting and downshifting will occur in sequence or skip shifting can occur if desired by manipulation of the shift valves 32, 36 and 38 and corresponding control of the trim valves A and B.

The torque converter regulator valve 30 receives fluid pressure through passage 26 from the main system pressure. The regulator valve 30 includes a valve spool 68 slidably disposed in a valve bore 70, a control plug 72 slidably disposed in a valve bore 74 which is smaller in diameter than the valve bore 70, and a regulator or control spring 76 which is trapped between the valve spool 68 and a shoulder 78 formed at the junction of the valve bores 70 and 74.

The valve bore 70 has connected therewith an exhaust passage 80, a control passage 82 and a torque converter clutch apply passage 84. The torque converter, designated (TCC), has a passage 86 which communicates from the torque converter clutch to a chamber 88 formed between the plug 72 and the end of valve bore 74. The fluid pressure in chamber 88 forces the plug 72 to act against the end of valve spool 68 to provide pressure regulation within the torque converter clutch. Input bias pressure to the torque converter clutch valve 30 is provided at a chamber 90 from a pulse width modulated solenoid F.

As is well known, PWM solenoids will provide a Variable pressure output depending upon voltage or current within the solenoid coil. The pressure acting in chamber 90 forces the valve spool 68 upward, as seen in FIG. 1, against the force in spring 76, as well as the force in the plug 72. The spring 76 provides a substantially bias, while the force on plug 72 provides a bias that is equal to the torque converter clutch pressure. To adjust the torque converter clutch pressure, the pulse width modulated solenoid F can be manipulated to reduce the pressure in chamber 90 thereby providing an exhaust connection for the torque converter clutch via passage 80 until the pressure balance within the regulator valve 30 is satisfied by the pressure in chamber 90 counteracted by the spring 76 and the pressure in chamber 88.

The exhaust pressure level in passage 80 is established by an exhaust pressure control valve 92 which permits the fluid to return to the sump or reservoir 14. The reason for the exhaust pressure control valve such as 92 is to provide a positive holding pressure or fill pressure within the various friction devices. The controlled exhaust or fill pressure level of the friction devices permits for a consistent operation of these devices when electronic control mechanisms are used. In the case of the rotating clutches C1 and C2, it is well known to counteract the fill pressure and the centrifugal pressures which generate therefrom when the clutch is disengaged with a pressure balancing chamber.

The control system, as shown in FIG. 2, in the low forward drive condition. This is the condition established by the operator when it is desirable to accelerate the vehicle under normal operating conditions. In this condition, the solenoid D is energized while the solenoids E and C are de-energized. With the energization of solenoid D and the de-energization of solenoid C, fluid pressure in a passage 94 is directed from the chamber 52 to the valve 38 from which it is directed to the passage 82.

As previously mentioned, the fluid pressure in passage 82 communicates between the valve spool 68 and plug 72. When the output pressure of solenoid D is communicated to the area of the spring 76, the torque converter regulator valve is prevented from operating regardless of the condition of the solenoid F. The torque converter regulator spool 68 will have two unbalancing forces operating thereon, namely the spring 76 and the fluid pressure distributed by solenoid D. Since the pressure distributed by solenoid D can be equal to the maximum pressure distributed by solenoid F, the regulator valve 30 will not move from the position shown in FIG. 2, such that the torque converter clutch is continually exhausted through the valve spool 68 and the passage 80.

In FIG. 3, the transmission control 10 is conditioned for reverse operation at the manual valve 34. In this condition, the electronic controls within the transmission are operable to control the solenoid E to an actuated state, the solenoid D to an actuated state and the solenoid C to an unactuated state. Thus, the shift valves 32 and 36 are in the pressure set position while the valve 38 is in the spring set position. In the spring set position of the valve 38, the fluid pressure at solenoid D is distributed to the regulator valve 30 as described above for the low forward operation, thus preventing actuation of the torque converter clutch.

The shift valve 36 in the pressure set position permits delivery of pressure from trim valve A to the friction device C5 while the pressure set condition of valve 32 permits the distribution of pressure from trim valve B via valve 38 in the spring set position to the friction device C3. The engagement of devices C3 and C5 establish the reverse operation within the transmission disclosed in shown in U.S. Pat. No. 4,070, 927. The important point to remember is that the torque converter clutch cannot be engaged during reverse operation.

The control 10, as shown in FIG. 4, is conditioned for the low hold operation. This condition is established by the operator when it is desirable to maintain engine braking on the vehicle during vehicle maneuvering such as descending a grade. To provide maximum engine brig, it is desirable to engage the torque converter clutch during this condition. Thus, the operator has available the means to establish a low hold condition which will permit the energization of solenoid C. The solenoid C is not normally energized in the low condition as explained previously with FIG. 2.

With the solenoid C energized, the valve 38 will assume the pressure set position as shown in FIG. 4. In this position, the fluid pressure from solenoid D in passage 94, is blocked from entering passage 82 by the valve spool 56. Thus, in this condition, when the solenoid valve F is energized, the valve 30 will perform its regulating function to establish the pressure within the torque converter clutch. Therefore, the maximum engine braking or vehicle deceleration can be attained in the low hold condition of the transmission, while the torque converter clutch cannot be engaged as seen in FIG. 2 during the normal low drive operation.

From the foregoing description, it should be obvious that this invention will prevent torque converter clutch actuation during normal low speed forward and reverse operations. Also, since the torque converter clutch cannot engage during these conditions, the likelihood of engine stalling is prevented. However, during those times when torque converter clutch operation is desired in low speed operation or in neutral, this invention does permit that condition to occur. It should also be appreciated that the operator will be aware that the torque converter clutch is not operating should the low hold condition be established and the engine braking not occur. Likewise, during operation of the power take off shaft in neutral, the disengagement of the torque converter clutch will be evident due to the variations in the output speed of the power take off shaft as load varies on the take off shaft.

What is claimed is:

1. An electro-hydraulic controlled power transmission having a torque converter clutch and a plurality of operating conditions including a first range, a neutral range, a reverse range and a first hold condition:
    a hydraulic control for selectively establishing the operating conditions and for controlling the disengagement of the torque converter clutch comprising:
    a source of fluid pressure;
    a first solenoid controlled shifter valve having an energized condition and a de-energized condition;
    a second solenoid controlled shift valve having an energized condition and a de-energized condition; and
    a selectively operable torque converter clutch valve including a selectively energizable solenoid control having an engaged condition and a disengaged condition, said first valve being energized in the first range and the reverse range to direct the control pressure to the torque converter clutch valve to enforce the disengaged condition, said second shift valve being energized in the first hold condition and the neutral range to prevent enforcement of the torque converter clutch valve to the disengaged condition, and to permit establishment of the engaged condition when said solenoid control is engaged to direct fluid pressure from said source to a torque converter clutch.

2. An electro-hydraulic controlled power transmission having a torque converter clutch and a plurality of operating conditions including a first range, a neutral range, a reverse range and a first hold condition:
    a hydraulic control for selectively establishing the operating conditions and for controlling the disengagement of the torque converter clutch comprising:
    a source of fluid pressure;
    a first solenoid controlled shifter valve having an energized condition and a de-energized condition;
    a second solenoid controlled shift valve having an energized condition and a de-energized condition; and
    a selectively operable torque converter clutch valve including a selectively energizable solenoid control valve having an engaged condition and a disengaged condition, a control chamber and a feedback chamber, said first valve being energized in the first range and the reverse range to direct the control pressure to the control chamber of the torque converter clutch valve to enforce the disengaged condition, said second shift valve being energized in the first hold condition and the neutral range to exhaust the control chamber and prevent enforcement of the torque converter clutch valve to the disengaged condition, and to permit establishment of the engaged condition when said selectively energizable solenoid control valve is engaged to direct fluid pressure from said source to a torque converter clutch.

3. The electro-hydraulic control power transmission defined in claim 2, wherein said torque converter clutch control valve includes a passage communicating a clutch engagement pressure to the feedback chamber to counteract a pressure from said selectively energizable solenoid control valve.

4. An electro-hydraulic control in a power transmission having a torque converter clutch and a plurality of operating conditions including a first range, a neutral range, a reverse range and a first hold condition:
    a hydraulic control for selectively establishing the operating conditions and for controlling the disengagement of the torque converter clutch comprising:
    a source of fluid pressure;
    a first solenoid controlled relay valve having an energized condition and a de-energized condition;
    a second solenoid controlled relay valve having an energized condition and a de-energized condition; and
    a selectively operable variable output pressure torque converter clutch valve having an engaged condition for providing an output pressure and a disengaged condition, including a selectively energizable solenoid control providing a variable control pressure, a first chamber, a second chamber, a feedback chamber, a first slidable valve element disposed between said first and second chambers and a second slidable element disposed between said second chamber and said feedback chamber, said first relay valve being energized in the first range, the neutral range, the reverse range and the first hold condition to direct a control pressure through said second relay valve to said second chamber of said torque converter clutch valve to enforce the disengaged condition, said second relay valve being energized in the first hold condition and the neutral range to block the control pressure from the first relay valve and exhaust said second chamber to prevent enforcement of the torque converter clutch valve to the disengaged condition, and to permit establishment of the engaged condition when said selectively energizable solenoid control is energized to pressurize said first chamber to enforce the engaged condition to direct fluid pressure from said source to said feedback chamber to limit output pressure of the torque converter clutch valve and said first slidable valve element being operable to direct the output pressure to a torque converter clutch.

* * * * *